United States Patent [19]
Owens et al.

[11] Patent Number: 5,587,181
[45] Date of Patent: Dec. 24, 1996

[54] MAGNETIC SUPPORT SYSTEM FOR CABLE INSERTION TUBE

[75] Inventors: Steve C. Owens, Coweta County; Richard V. Lovvorn, Carroll County; Albert B. Elder, Haralson County, all of Ga.

[73] Assignee: Southwire Company, Carrollton, Ga.

[21] Appl. No.: 366,703

[22] Filed: Dec. 30, 1994

Related U.S. Application Data

[63] Continuation-in-part of Ser. No. 232,883, Apr. 25, 1994, Pat. No. 5,439,363.

[51] Int. Cl.$^6$ .................................................. B29C 47/90
[52] U.S. Cl. ........................... 425/3; 425/67; 425/71; 425/113; 425/461; 264/178 R; 264/209.4
[58] Field of Search ................................ 425/3, 67, 68, 425/70, 71, 113, 461; 264/178 R, 209.4

[56] References Cited

U.S. PATENT DOCUMENTS

| | | |
|---|---|---|
| 2,945,258 | 7/1960 | Houston . |
| 3,211,818 | 10/1965 | Beckwith . |
| 3,296,344 | 1/1967 | Timmerman . |
| 3,530,536 | 9/1970 | Thorman et al. . |
| 3,538,210 | 11/1970 | Gatto . |
| 3,893,465 | 7/1975 | Cheatwood . |
| 4,086,044 | 4/1976 | Sikora ........................................ 425/113 |
| 4,137,025 | 1/1979 | Graves et al. . |
| 4,508,500 | 4/1985 | French . |
| 4,575,326 | 3/1986 | French . |
| 5,139,402 | 8/1992 | Topf . |
| 5,271,786 | 12/1993 | Coorney et al. ............................ 425/71 |

FOREIGN PATENT DOCUMENTS 1581554  10/1976  United Kingdom .

*Primary Examiner*—Khanh P. Nguyen
*Attorney, Agent, or Firm*—Stanley L. Tate; James W. Wallis, Jr.

[57] ABSTRACT

A ferromagnetic cable insertion tube is cantilevered from a polymeric conduit extruder and separates an electrical and/or optical cable being pulled through the conduit from the inner surface of the conduit until it has solidified. A d.c. current source is applied to a coil surrounding the cable insertion tube upstream or downstream of the extruder so as to induce a magnetic flux in the tube and create a north pole at the downstream free end of the tube and a south pole at the upstream free end of the tube. An array of magnets is assembled about the insertion tube at the downstream free end or north pole thereof. The magnets are arranged with their north poles confronting the north pole of the insertion tube so that the repulsive forces between the like poles magnetically levitate the free end of the insertion tube and keep it from sagging into contact with the extruded conduit.

14 Claims, 5 Drawing Sheets

5,587,181

MAGNETIC SUPPORT SYSTEM FOR CABLE INSERTION TUBE

CROSS-REFERENCE TO RELATED APPLICATION

This application is a continuation-in-part of our U.S. application Ser. No. 08/232,883 filed Apr. 25, 1994 now U.S. Pat. No. 5,439,363.

FIELD OF THE INVENTION

The present invention relates to the extrusion of polymeric conduit around cables, such as electrical and optical cables, and more particularly, to an apparatus for supporting the downstream free end of a cable insertion tube extending inside the conduit during extrusion thereof.

BACKGROUND OF THE INVENTION

Electrical and optical cables, and especially continuously formed electrical and optical cables, are often encased in a seamless polymeric ("plastic") sheath or conduit of indeterminate length which provides a durable enclosure especially useful in subterranean applications. The resulting assembly is fabricated by pulling the cables through an extruder apparatus in which a plastic conduit is extruded about the longitudinal extent of the cables, the outer diameter of the plastic conduit then being sized by calibrator sizing rings positioned immediately downstream of the extruder head, followed by cooling and solidification of the conduit by passage of the assembly through serially-connected water cooling tanks.

Depending on the rate of extrusion and the rate of cooling of the conduit, the cables can contact the still-tacky inner surface of the plastic conduit resulting in the cables sticking to the inner surface as they travel with the extruded conduit. It is sometimes desirable to remove and replace the cables inside the conduit without replacing the conduit, especially in the case of underground installations. Accordingly, removal of the cables by pulling them from the plastic conduit would be prevented if the cables were adhered to the inner surface of the conduit.

Various approaches have been taken to overcome this problem. U.S. Pat. No. 3,211,818 discloses an extruder apparatus for making a conduit and cable assembly. The apparatus has a rigid tubular mandrel cantilevered from the extruder in the downstream direction of the extruded plastic conduit. The cantilevered tube supports the cables to be encased by the conduit and extends into a coolant sprayhead area a distance which is sufficient to allow for substantial solidification of the plastic conduit before the inner surface thereof is contacted by the cables. However, when the extrusion rate is increased, the cantilevered tube must be lengthened commensurately since solidification of the conduit and elimination of the tackiness of the inner surface of the conduit takes place farther downstream. When the cantilevered tube is lengthened, it begins to sag under its own weight causing the free end thereof to bear against the inner of the unsolidified conduit and resulting in gouging of the conduit wall of the conduit.

Another approach is disclosed in U.S. Pat. No. 4,508,500 in which a cable conduit extrusion apparatus includes a flexible corrugated metal tube extending from the extruder outlet into the extruded conduit as it travels through a differential pressure calibrating and cooling tank. The flexible tube has an outside diameter substantially the same as the inside diameter of the extruded conduit and is thereby supported along a substantial portion of the conduit on the peaks of the corrugations of the flexible tube. The flexible tube is primarily intended to accommodate up and down movement of the conduit resulting from buoyant forces acting on the conduit during its travel through the cooling tank. This apparatus still results in undesirable contact between the corrugated tube and unsolidified portions of the extruded conduit.

It would be desirable therefore to provide an apparatus for extruding a conduit containing one or more cables in which the cables and all other parts of the apparatus are kept separated from the inner wall of the conduit until the conduit is completely solidified regardless of the extrusion speed of the apparatus.

SUMMARY OF THE INVENTION

It is an object of the present invention to control sagging of a cantilevered cable insertion tube during extrusion and fabrication of an assembly of a plastic conduit and an electrical or optical cable by providing apparatus which maintains substantially concentric spacing and separation between the cable insertion tube and the unsolidified extruded plastic conduit regardless of the rate of extrusion.

It is another object of the present invention to provide apparatus for extruding a plastic conduit about electrical and/or optical cables at high operating speeds.

The present invention provides apparatus for preventing sagging of a cantilevered cable insertion tube which carries electrical and/or optical cables as they are being encased in an extruded plastic conduit of indeterminate length. The insertion tube is formed of a cylindrical ferromagnetic pipe cantilevered from the extruder apparatus. An annular array of permanent magnets or electromagnets is assembled about the downstream free end of the cantilevered insertion tube. The magnets are arranged to surround the extruded conduit and the downstream free end (north pole) of the insertion tube.

According to a first embodiment of the invention, a d.c. current source is applied to a coil surrounding the free end of the insertion tube upstream of the extruder apparatus. According to a second embodiment of the invention, a second annular array of permanent magnets or electromagnets is assembled about the insertion tube at an intermediate position thereof, but downstream of the extruder apparatus. A d.c. current source is applied to a coil surrounding the insertion tube between the two annular arrays of magnets.

According to both embodiments, when the d.c. current source is energized, the tube is magnetized in the manner of a bar magnet with the free end of the insertion tube defining a north (or south) pole and its upstream end or upstream portion defining a south (or north) pole. The magnets of each of the annular arrays positioned at the free end of the insertion tube are arranged with their north poles confronting the north pole of the insertion tube. The repulsive forces between the like poles of the magnets and the tube will magnetically levitate the free end of the insertion tube to keep it from sagging and will maintain it in a substantially concentric relationship with the extruded conduit.

The magnets are preferably sized, spaced and/or electrically controlled to take into account the gravitational forces acting on the insertion tube or to magnetically position or reposition the cable insertion tube to any desired spatial position inside the conduit. Advantageously, the cable insertion tube may be magnetically positioned and repositioned by computer-controlled electromagnets to accommodate heavier cable passing through the tube and to maintain the necessary spacing between the unsolidified inner surface of the plastic conduit and the insertion tube.

With the foregoing and other objects, advantages and features of the invention that will become hereinafter apparent, the nature of the invention may be more clearly understood by reference to the following detailed description of the invention, the appended claims, and to the several views illustrated in the attached drawings.

DETAILED DESCRIPTION OF THE INVENTION

Figure 1:
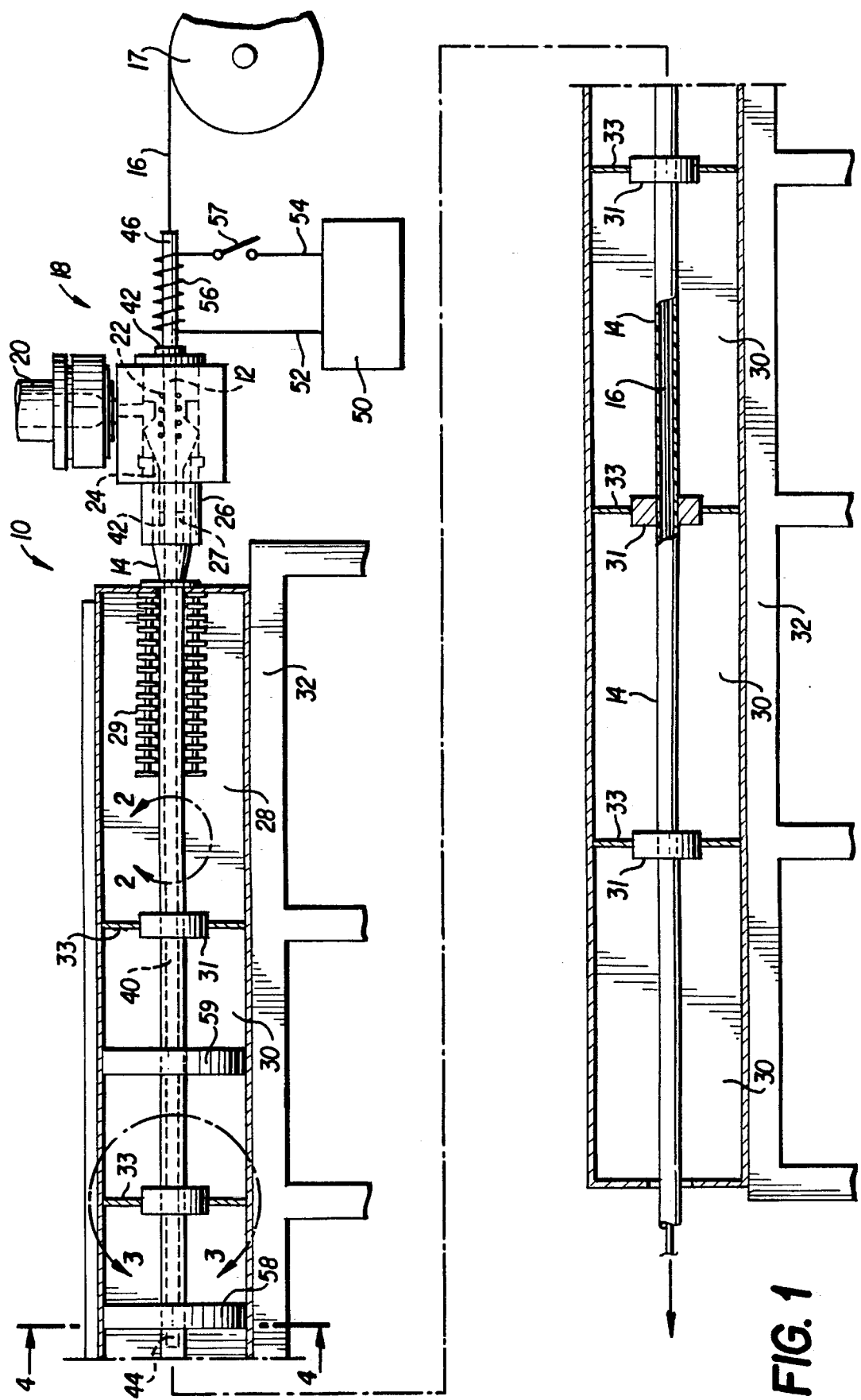
FIG. 1 is a side elevational view, partly in cross-section, of a first embodiment of the magnetic support system of the present invention used in connection with a conventional plastic conduit extrusion apparatus.

Referring now in detail to the drawings wherein like parts are designated by like reference numerals throughout, there is illustrated in FIG. 1 a magnetic support system 10 for supporting a cable insertion tube 12 during extrusion of a polymeric ("plastic") conduit 14 about electrical wires or optical fibers 16 or the like, hereinafter collectively termed "cables." The cables 16 are supplied from one or more pay-off reels 17 to a polymer-melt extruder 18. The extruder 18 includes an inlet 20 for receiving a polymer-melt supply, such as a polyethylene resin, a heater 22 for maintaining the polymer-melt supply in a semi-liquid state, and an annular flow passageway 24 for forming the flow of the liquefied polymer-melt within the extruder 18 around the cables 16. The extruder 18 also includes an extrusion outlet 26 having an annular die orifice 27 through which the plastic is extruded to form conduit 14. Conduit 14 in a partially solidified state is directed to a differential pressure calibrating tank 28 filled with cooling water and having a plurality of calibrating rings 29 for sizing the outside diameter of the conduit. The sized plastic conduit 14 is then passed through a plurality of cooling water vacuum tanks 30 arranged in end-to-end relation with the differential pressure calibrating tank 28 on a raised support frame 32 in a manner similar to that shown in U.S. Pat. No. 3,538,210, the disclosure of which is incorporated herein by reference.

A cable insertion tube 40 made of a ferromagnetic material, such as steel, is rigidly mounted to the extruder 18 in a cantilevered fashion. The tube 40 extends through the extruder 18 inside of and concentric to the annular passageway 24 and die orifice 27 that forms the extruded conduit 14. The tube 40 is preferably heat insulated from the metal parts of the extruder 18 by bushings 42 to minimize conductive heat transfer to the tube 40 from the extruder 18. The cable insertion tube 40 includes a first free end 44 (FIGS. 1 and 5) extending downstream of the extruder 18 to a point where the inner surface of conduit 14 is solidified and substantially non-tacky regardless of the extrusion rate of the conduit. A second free end 46 of the tube 40 extends from the extruder 18 in an upstream direction and cable 16 is fed into the tube from the pay-off reel(s) 17.

Figure 2:
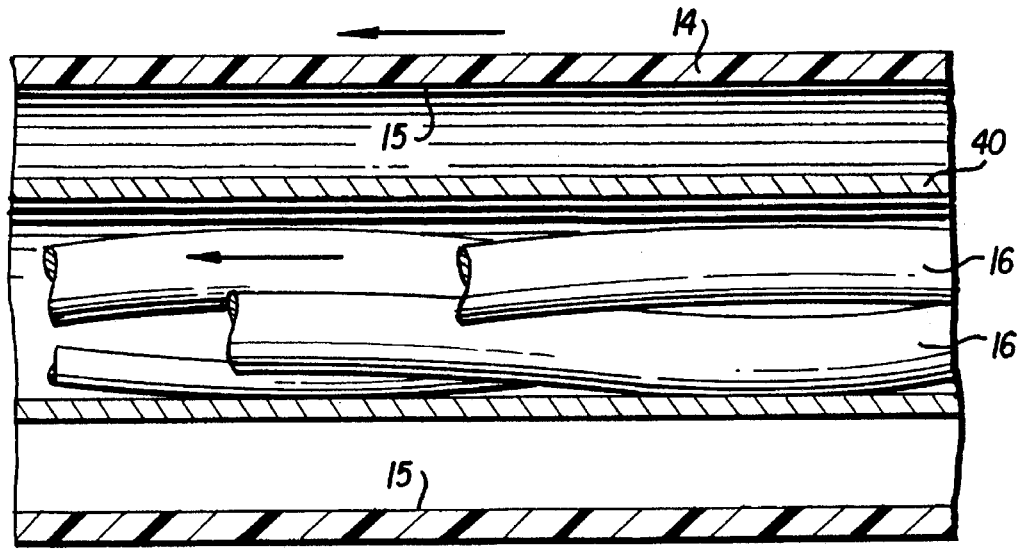
FIG. 2 is a vertical cross-sectional view, taken at detail 2—2 in FIG. 1, showing an assembly of electrical and/or optical cables being supported by the cable insertion tube of the present invention magnetically held in concentric relationship within the extruded plastic conduit at an intermediate position of the cable insertion tube.
Figure 3:
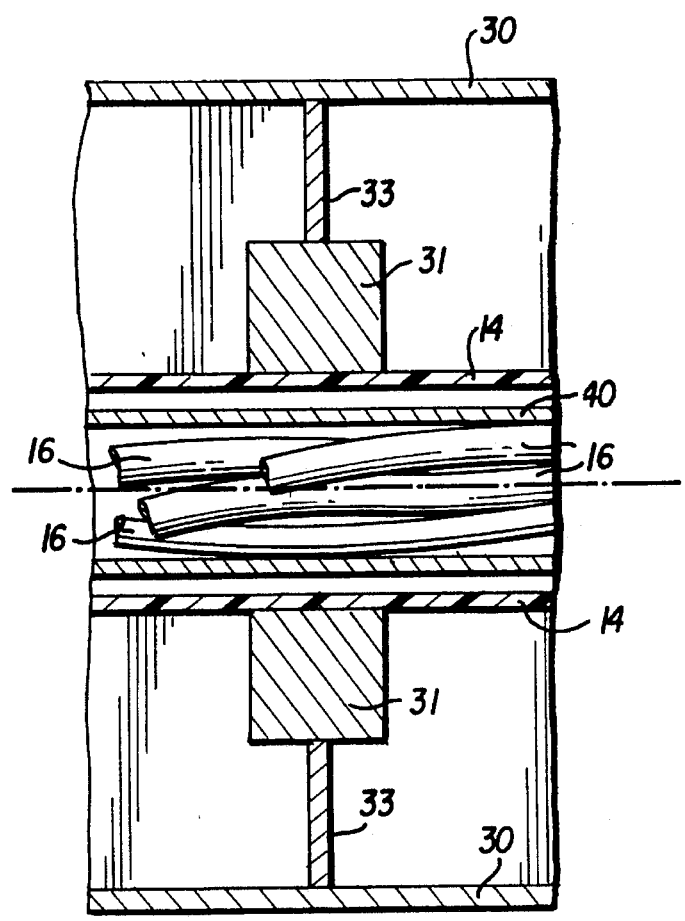
FIG. 3 is a vertical cross-sectional view, taken at detail 3—3 in FIG. 1, showing a hard support located at an intermediate length of the cable insertion tube for constraining the extruded conduit to a predetermined path through the coolant tanks.

With reference to the FIG. 2 detail, the cable insertion tube 40 is substantially cylindrical in cross-section and supports the cables 16 spaced radially inwardly away from the inner surface 15 of the conduit 14. It will be appreciated that the tube 40 remains stationary and the conduit 14 and cables 16 travel in the direction of the arrows at substantially the same speed, namely, the rate of extrusion from extruder 18. Now referring to FIG. 3, a hard support 31 constrains the extruded conduit 14 to a fixed longitudinal axis along the length of the cooling tanks 28, 30. At least one such support 31 is provided in each bulkhead 33 separating the water tanks 28, 30 from one another.

Referring again to FIG. 1, a d.c. current source 50 is electrically connected through leads 52, 54 to an electrical coil 56 circumferentially surrounding the second or upstream free end 46 of the cable insertion tube 40. When the circuit is closed by operation of a switch 57, electrical current provided by the current source 50 flows through the coil 56 so as to induce a magnetic flux in the cable insertion tube 40 and generate a magnetic field with a first polarity at the first free end 44 and a second, opposite polarity at the second free end 46 so that, e.g., the downstream end 44 is a north (or south) pole and the upstream end 46 is a south (or north) pole, depending on the direction of current flow in the coil 56.

Figure 4:
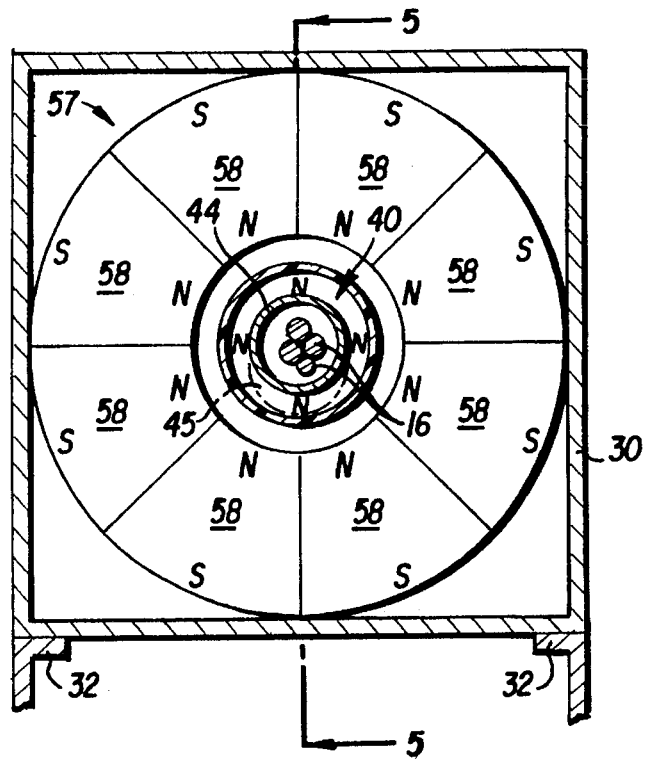
FIG. 4 is a transverse vertical cross-sectional view of the first embodiment of the magnetic support system of the present invention, taken along line 4—4 of FIG. 1.
Figure 5:
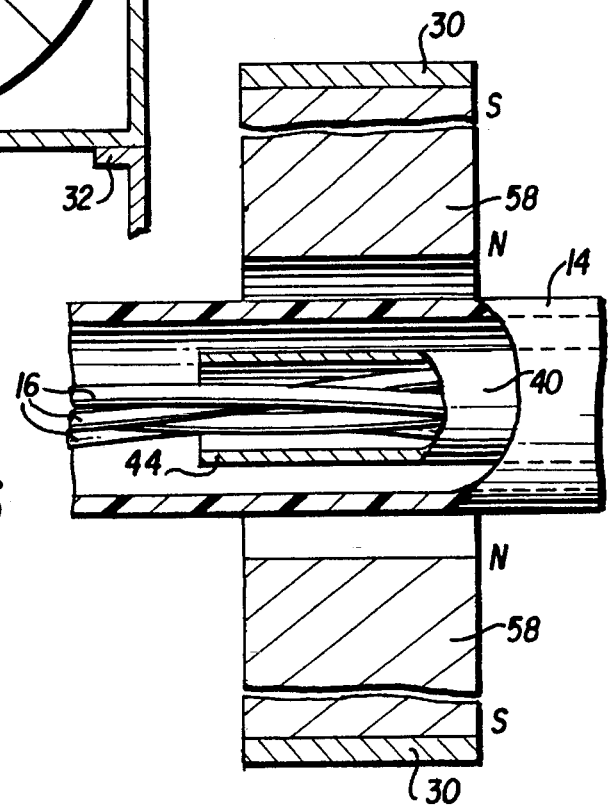
FIG. 5 is a vertical cross-sectional view of the first embodiment of the magnetic support system of the present invention, taken along line 5—5 of FIG. 4, showing the free downstream end of the cable insertion tube being magnetically supported in concentric relationship with the plastic conduit.

Referring now to FIGS. 4 and 5, a plurality of magnets 58 are arranged in an annular structure 57 substantially concentrically to the extruded conduit 14 at the downstream or first end 44 of the insertion tube 40 such that the north pole of the magnets 58 confront the first end 44 or north pole 44 of the tube 40. The repulsive forces between the like poles will keep the first free end 44 of the insertion tube 40 from sagging under its own weight and the weight of cables 16 and will maintain it in a substantially concentric relationship with the extruded conduit 14. As will be appreciated by the skilled artisan, each annular magnetic structure may be a unitary structure or an array of individual magnets 58 as shown. Furthermore, it will be appreciated that the magnetic structure 57 will be either eccentrically positioned or magnetically biased to account for the gravitational forces acting on the tube 40.

It is contemplated that the magnet structure 57 could be an electromagnet having a d.c. current source for selective energization. It is further contemplated that the system of the present invention could be operated under computer control in combination with one or more electromagnets, whereby variation of the magnetic flux field of part or all of each magnet 58 is accomplished by altering the d.c. current supplied thereto, to enable incremental adjustment of the position of the free end 44 of the tube relative to the inner wall of the plastic conduit 14. Such control may be especially desirable where, for example, cables 16 of varying weights are carried in the tube 40.

An additional magnet, such as an electromagnet 59, having a magnet structure similar to magnet structure 57 may be positioned near the downstream end 44 of cable insertion tube 40, as shown in FIG. 1 to reinforce or selectively alter or adjust the desired concentricity of the tube within the conduit.

Figure 6:
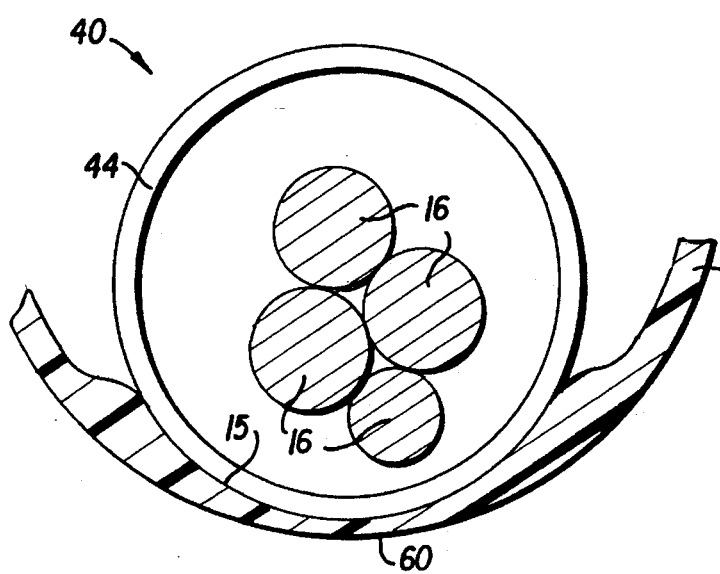
FIG. 6 is a cross-sectional view of an assembly of electrical and/or optical cables carried by a cable insertion tube, showing the position of the free end of the cable insertion tube if it were unsupported by the magnetic support system of the present invention.

According to the present invention and with reference to FIG. 4, when the power source 50 is energized, a magnetic flux is generated in the cable insertion in tube 40 to define a north pole N at the free end 44 of the tube 40. Repulsive magnetic forces generated by north poles N of the magnets 58 magnetically levitate or suspend the free end 44 of the cable insertion tube 40 in a substantially concentric relationship with the plastic conduit 14. Deenergizing the magnetic flux field in tube 40 by opening switch 57 results in sagging of the free end 44 under its own weight and the weight of cables 16 to a new position 45 shown in phantom lines in FIG. 4. With particular reference to FIG. 6, such deenergizing of the power source 50 would result in the free end 44 engaging the inner wall 15 of the conduit and gouging or thinning out the wall of conduit 14 at the lowermost portion 60 thereof. This is the position the free end 44 of tube 40 would take in the prior art devices in which the insertion tube was lengthened because of substantially increased extrusion rates of the conduit resulting in the existence of a tacky condition of the inner conduit wall farther downstream in the conduit. This prior art condition of FIG. 6 is eliminated by the present invention.

Figure 7:
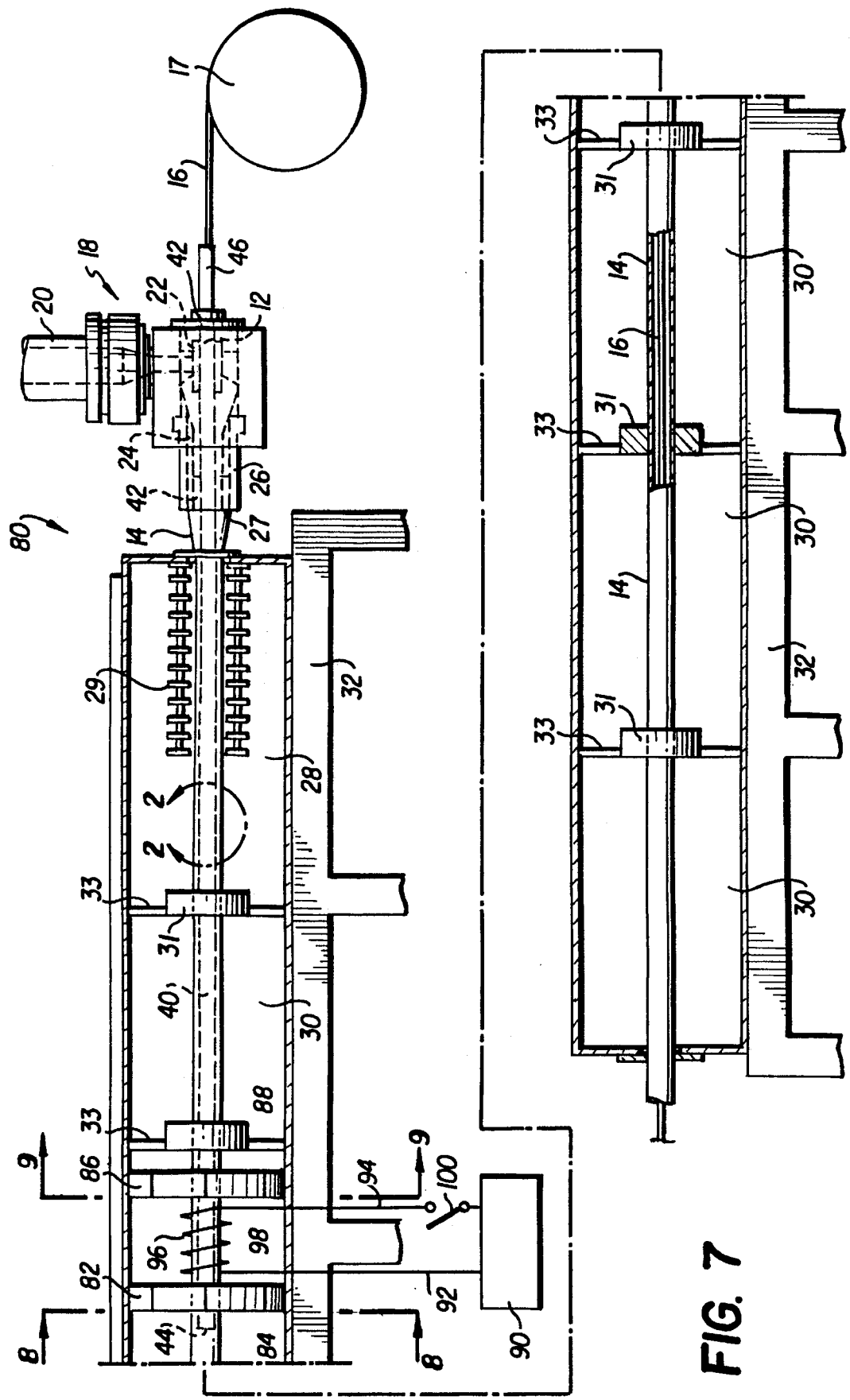
FIG. 7 is a side elevational view, partly in cross-section, of a second embodiment of the magnetic support system of the present invention used in connection with a conventional plastic conduit extrusion apparatus.
Figure 8:
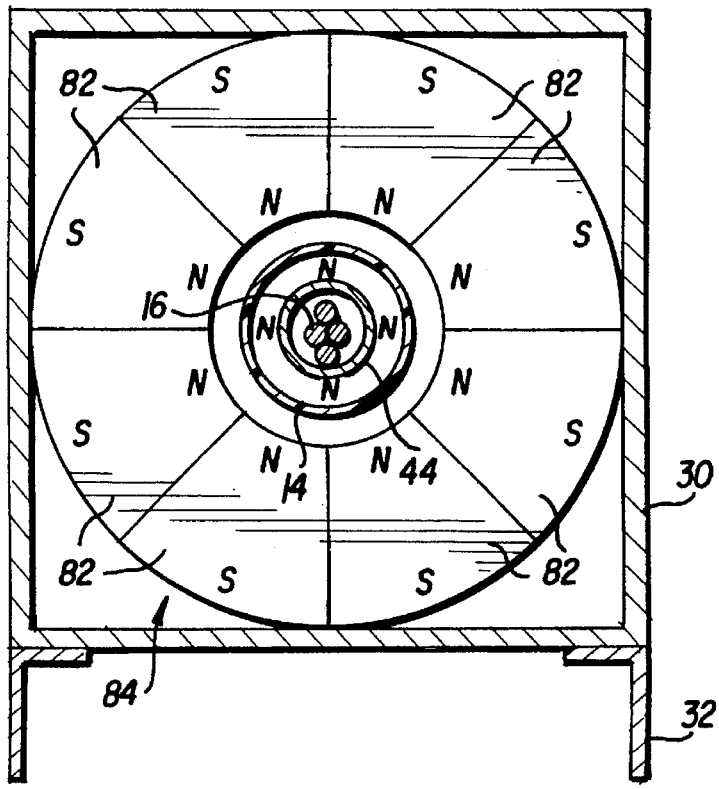
FIG. 8 is a transverse vertical cross-sectional view of the second embodiment of the magnetic support system of the present invention, taken along line 8—8 of FIG. 7, showing a first annular magnetic structure adjacent a free downstream end of the cable insertion tube.
Figure 9:
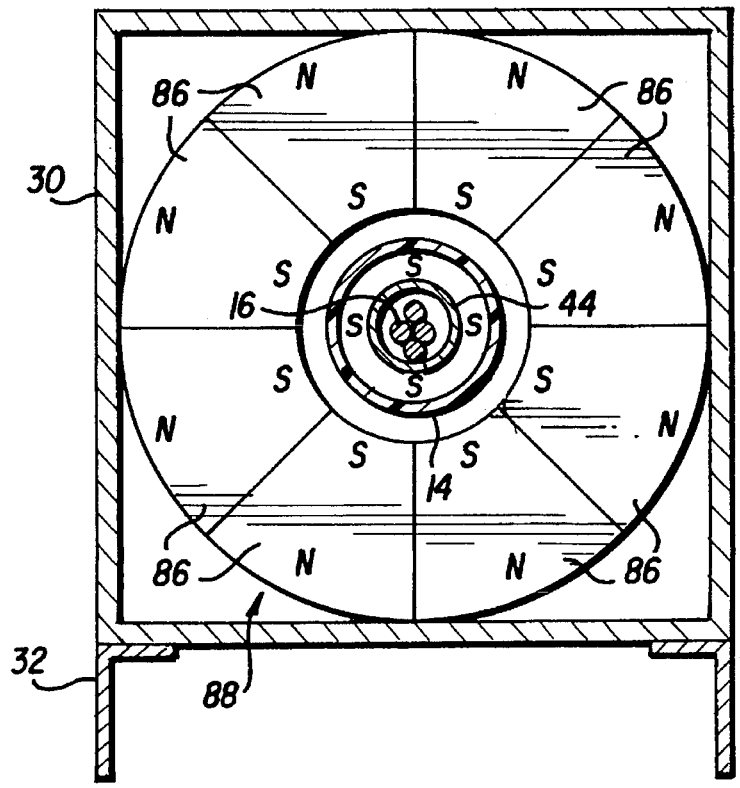
FIG. 9 is another transverse vertical cross-sectional view of the second embodiment of the magnetic support system of the present invention, taken along line 9—9 of FIG. 7, showing a second annular magnetic structure upstream of the first annular structure and downstream of the extruder apparatus, the annular structures bounding an electrical coil surrounding a section of the cable insertion tube extending therebetween.

FIGS. 7–9 show in a second embodiment of the present invention another magnetic support system 80 for supporting the cable insertion tube 12 during extrusion of a plastic conduit 14 about electrical wires or optical fibers 16. A first plurality of magnets 82 is arranged in a first annular structure 84 (FIG. 8) substantially concentrically to the extruded conduit 14 at the downstream or first end 44 of the insertion tube 40 such that the north poles of the magnets 82 confront the first end or north pole 44 of the tube 40. A second plurality of magnets 86 are arranged in a second annular structure 88 (FIG. 9) at an intermediate section of the insertion tube 40 upstream of and substantially parallel to the first annular structure 84, but downstream of the extruder apparatus 18. Preferably, the second annular structure 88 is paired with the first annular structure 84 in a common cooling tank 30, although it is contemplated that the annular magnetic structures 84, 88 may be installed in separate cooling tanks 28, 30 as necessary to meet apparatus cooling requirements and structural constraints.

A d.c. current source 90 is electrically connected through leads 92, 94 to an electrical coil 96 circumferentially surrounding a section 98 of the cable insertion tube 40 extending between the annular magnetic structures 84, 88. When the circuit is closed by operation of a switch 100, electrical current provided by the current source 90 flows through the coil 96 so as to induce a magnetic flux in the localized insertion tube section 98 and generate a magnetic field with a first polarity at the downstream end 44 and a second, opposite polarity at an upstream position of the insertion tube 40 adjacent to the second annular structure 84 so that the downstream end 44 becomes a magnetic north pole and the insertion tube adjacent to the second annular structure 84 becomes a magnetic south pole. It will be apparent to the skilled artisan that the polarities of magnets 82, 86 of the annular magnetic structures 84, 88, respectively, and the polarity of the electrical current flow provided by the current source 90 may be reversed to provided a corresponding reversal in polarity of the magnetic flux in the cable insertion tube 40. It will also be appreciated that magnetic support system 80 may provide more localized control with a lesser electrical current requirement over the deflection of the downstream end 44 of the cable insertion tube 40 because the necessary flux field to be generated by the components of this alternate embodiment is confined to a shorter length of the insertion tube 40.

Although a preferred embodiment of the guide tube of the present invention has been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. Apparatus for positioning a cable in a bore of an extruded polymeric conduit, comprising:

means for extruding the conduit;

a ferromagnetic cable insertion tube cantilevered from said extruding means and adapted to extend through said bore in the downstream direction of the extruded conduit, said tube having a downstream free end;

means for inducing a magnetic flux in said cable insertion tube downstream of said extruding means to form a first magnetic pole having a first polarity at said downstream free end and a second magnetic pole having a second polarity opposite to the first polarity upstream of said downstream free end; and means for generating a first magnetic field in the vicinity of said downstream free end of said cable insertion tube, and means for generating a second magnetic field intermediate of said downstream free end and said extruding means to magnetically levitate said tube and prevent the free end thereof from sagging and contacting the polymeric conduit.

2. Apparatus according to claim 1, wherein said magnetic inducing means comprises an electrical winding having an upstream end and a downstream end surrounding a portion of said cable insertion tube downstream of said extruding means and a first source of electric power connected to said winding for inducing a magnetic flux in said tube with the first polarity at said downstream free end and the second polarity upstream of said downstream free end of said tube.

3. Apparatus according to claim 2, wherein said generating means comprises a first magnet having a pole with a polarity the same as the first polarity said first magnet pole being disposed adjacent said downstream free end of cable insertion tube and in confronting relation therewith, and a second magnet having a pole with a polarity the same as the second polarity said second magnet pole being disposed intermediate of the upstream end of said electrical winding and said extruding means.

4. Apparatus according to claim 3, wherein at least one of said magnets is an electromagnet.

5. Apparatus according to claim 3, wherein each said first magnet and said second magnet comprise an annular magnet structure arranged to surround the conduit and said cable insertion tube at a longitudinal extent thereof.

6. Apparatus according to claim 5, wherein said cable insertion tube is substantially cylindrical along the downstream extent thereof, each of said magnet structures having a central opening adapted to receive the downstream free end of said tube, said first magnet structure having an inner circumferential face comprising a pole with a polarity the same as the first polarity of the downstream free end of the tube, said second magnet structure having an inner circumferential face comprising a pole with a polarity the same as the second polarity.

7. Apparatus according to claim 4, further comprising means for selectively energizing the electromagnet with a second source of electric power for generating a polarity corresponding to the pole thereof.

8. Apparatus according to claim 2, further comprising an upstream free end of said cable insertion tube extending upstream from the extruding means and including means for paying out the cable into said upstream free end.

9. Apparatus for positioning a cable in a bore of an extruded polymeric conduit, comprising:

means for extruding the conduit;

a ferromagnetic cable insertion tube cantilevered from said extruding means and adapted to extend upstream of said extruding means and downstream of said extruding means through said bore of the extruded conduit, said cable insertion tube having a first free end at the downstream end thereof and a second free end at the upstream end thereof;

an electrical winding having an upstream end and a downstream end surrounding a portion of said cable insertion tube downstream of said extruding means;

a d.c. power source connected to said winding for generating a magnetic flux in said cable insertion tube downstream of said extruding means to form a first magnetic pole having a first polarity at said downstream free end and a second magnetic pole having a second polarity opposite to the first polarity upstream of said downstream free end; and a first magnet means having a first magnetic pole with a polarity the same as the first polarity and supported in confronting relationship with said downstream free end of said cable insertion tube, and a second magnet means having a second magnetic pole with a polarity the same as the second polarity and supported in confronting relationship with said cable insertion tube intermediate of said downstream free end and said extruding means in such position for magnetically levitating said tube and preventing the free end thereof from sagging into contact with the polymeric conduit.

10. Apparatus according to claim 9, wherein at least one of said magnets is an electromagnet and means operatively connected to said electromagnet for controlling the strength of the magnetic field of said electromagnet.

11. Apparatus according to claim 9, wherein said first magnet comprises a plurality of magnets arranged in an annular structure about said downstream free end of said cable insertion tube.

12. Apparatus according to claim 9, wherein said second magnet comprises a plurality of magnets arranged in an annular structure to surround the conduit and said cable insertion tube.

13. Apparatus according to claim 9, including a plurality of cooling tanks arranged downstream of said extruding means, said tube extending through at least some of said cooling tanks, at least one said magnet means being positioned in one of said cooling tanks adjacent the first free end of the tube.

14. Apparatus according to claim 13, wherein said magnet means are positioned in separate ones of said cooling tanks.

* * * * *